United States Patent [19]

Vilmur

[11] 4,400,584
[45] Aug. 23, 1983

[54] SPEAKERPHONE FOR RADIO AND, LANDLINE TELEPHONES

[75] Inventor: Richard J. Vilmur, Bellwood, Ill.

[73] Assignee: Motorola, Inc., Schaumburg, Ill.

[21] Appl. No.: 365,811

[22] Filed: Apr. 5, 1982

[51] Int. Cl.³ .................. H04M 1/62; H04M 9/08
[52] U.S. Cl. ...................... 179/1 HF; 179/1 VC; 179/1 P; 179/2 EA
[58] Field of Search ............. 179/1 FS, 1 HF, 1 P, 179/1 VC, 2 EA, 81 B, 100 L

[56] References Cited

U.S. PATENT DOCUMENTS

| | | |
|---|---|---|
| 2,269,565 | 1/1942 | Tillman . |
| 2,589,662 | 3/1952 | Bjornson . |
| 3,387,222 | 6/1968 | Hellwarth et al. . |
| 3,725,585 | 4/1973 | Moniak et al. ............... 179/1 HG |
| 3,729,623 | 4/1973 | Dolby ........................ 179/1 P X |
| 3,729,682 | 4/1973 | Elder . |
| 3,743,791 | 7/1973 | Duff et al. ................... 179/81 B |
| 3,751,602 | 8/1973 | Breeden ...................... 179/81 B |
| 3,753,159 | 8/1973 | Burwen ....................... 179/1 P X |
| 3,889,059 | 6/1975 | Thompson et al. ............. 179/81 B |
| 3,894,187 | 7/1975 | Shibata et al. ............... 179/1 HF |
| 3,906,166 | 9/1975 | Cooper . |
| 3,962,553 | 6/1976 | Linder et al. ................ 179/1 VC X |
| 3,963,868 | 6/1976 | Randmere et al. ............. 179/1 HF |
| 3,984,776 | 10/1976 | Stedman . |
| 4,025,728 | 5/1977 | Jacobson .................... 179/1 HF X |
| 4,028,627 | 6/1977 | Cho et al. . |
| 4,034,299 | 7/1977 | Cho et al. . |
| 4,037,158 | 7/1977 | Eastmond . |
| 4,052,562 | 10/1977 | Anderson .................... 179/1 HF |
| 4,087,636 | 5/1978 | Akiyama et al. .............. 179/2 EA X |
| 4,122,304 | 10/1978 | Mallien . |
| 4,147,892 | 4/1979 | Miller ....................... 179/1 HF |
| 4,178,548 | 12/1979 | Thompson . |
| 4,215,252 | 7/1980 | Onufry, Jr. ................. 179/1 HF X |
| 4,220,820 | 9/1980 | Mallien . |
| 4,225,754 | 9/1980 | Bernard et al. .............. 179/81 B |
| 4,293,740 | 10/1981 | Gibb et al. .................. 179/1 HF X |
| 4,308,427 | 12/1981 | Danford ..................... 179/1 HF |
| 4,317,959 | 3/1982 | Kuriki ....................... 179/81 B X |
| 4,319,086 | 3/1982 | Thompson .................... 179/1 HF |
| 4,359,606 | 11/1982 | Shoichi ...................... 179/1 HF X |
| 4,378,603 | 3/1983 | Eastmond .................... 179/1 VC X |

FOREIGN PATENT DOCUMENTS 2003002  2/1979  United Kingdom ............ 179/1 VC

OTHER PUBLICATIONS

"Portable Radiotelephone for Cellular Systems", Leitich & Linder VTG Conference, Sep. 15-17, 1980, Dearborn, Michigan.

Mobile Voice Pickup System, Shure Brothers, Inc. 1977.

The Tridar Phone.

Options for Mobile Telephones by Synthesis, Inc., Fairburn, GA.

Fundamental Considerations in the Design of Voice-Switched Speakerphone by A. Busala, The Bell System Technical Journal, vol. XXXIX, 3/60, #2.

An Interphone System for "Hands-Free" Operation of High Ambient Noise, by E. L. Torick & R. G. Allen, IEEE Transactions on Audio and Electroacoustics, vol. AU-14, No. 4, Dec. 1966.

Automatic Conditioning of Speech Signals by George A. Hellwarth & Gardner D. Jones, IEEE Transactions on Audio & Electroacoustics, vol. AU-16, No. 2, Jun. 1968.

*Primary Examiner*—Gene Z. Rubinson
*Assistant Examiner*—Keith E. George
*Attorney, Agent, or Firm*—Rolland R. Hackbart; James W. Gillman

[57] ABSTRACT

An improved speakerphone (120 and 130 in FIG. 1) for radio and landline telephones is described. The improved speakerphone (120 and 130) includes a microphone (102 and 132), a speaker (104 and 134) and unique control circuitry (106 and 136). The control circuitry of speakerphone (200 in FIG. 2) interfaces a microphone (250) to a transmit signal (220) and speaker (260) to a receive signal (222) of a duplex communication path, such as a radio channel or telephone line. An audio switch (212) opens or closes the speaker audio path in response to a control signal (224) from control logic (230), and another audio switch (202) opens or closes the microphone audio path in response to the binary complement of the control signal (224). Transmit and receive signal detectors (206 and 207), each includes a logarithmic amplifier (240), an envelope detector (241), a smoothing filter (245), a valley detector (242), a summer (243) and a comparator (244) for detecting the presence of audio signals in environments that may be subject to high background noise. Binary output signals from the transmit and receive signal detectors (206 and 207) are applied to control logic (230) which generates the control signal (224) for opening and closing the transmit and receive audio paths. The control logic (230 in FIG. 3) includes delay circuitry (316 and 318) and logic circuitry (304, 306, 308, 310, 312 and 314) for setting and resetting a flip-flop (302) storing the control signal (224). The control logic (230) changes the state of the control signal flip-flop (302) for switching the audio path between the microphone and speaker when audio signals from the presently closed audio path have not been detected for a time interval determined by the delay circuitry (316 and 318) and audio signals thereafter are detected on the other audio path.

27 Claims, 5 Drawing Figures

SPEAKERPHONE FOR RADIO AND LANDLINE TELEPHONES

RELATED PATENT APPLICATIONS

The instant application is related to U.S. patent application, Ser. No. 219,675, entitled "Radiotelephone With Hands-Free Operation", invented by Bruce C. Eastmond, filed on Dec. 23, 1980, now U.S. Pat. No. 4,378,603 and assigned to the instant assignee. By reference thereto, this related application is incorporated in its entirety into the instant application.

BACKGROUND ART

The present invention relates generally to speakerphones, and more particularly to an improved speakerphone that can advantageously be utilized in both radio and landline telephone systems.

In both radio and landline telephone systems, a user communicates by means of a handset that includes a speaker at one end which is placed close to the user's ear and a microphone at the other end which is held close to the user's mouth. Thus, the user has only one free hand since the other must be used to hold the telephone handset. In order to provide a greater degree of freedom to the user, speakerphones have been developed for use in landline telephone systems. A conventional speakerphone is typically coupled to the telephone line and when enabled allows the user to freely move about while still communicating with another party. Such speakerphones typically compare the volume of the two parties and select the party speaking the loudest. Furthermore, conventional speakerphones always revert to the listen mode a short time interval after the hands-free party stops talking. However, conventional speakerphones suffer from a number of problems including inability to accommodate high ambient noise environments and breakup due to feedback from the speaker to the microphone when the speaker amplification has been turned up. These conventional speakerphones work reasonably well when utilized with landline telephones in relatively quiet surroundings, but may not operate correctly when used in noisy environments and especially when used with a radio due to the high degree of ambient noise encountered in vehicles. For example, a high level of ambient noise may cause such speakerphones to always select the hands-free party. Accordingly, there is a need for an improved speakerphone that can accomodate noisy environments and lossy connections where the received voice signal is relatively low with respect to the voice signal of the hands-free party.

SUMMARY OF THE INVENTION

Accordingly, it is a general object of the present invention to provide an improved speakerphone that allows hands-free voice communications in environments having high levels of ambient noise.

It is yet another object of the present invention to provide an improved speakerphone allowing hands-free voice communications between two parties where switching between the two parties is performed both automatically and equitably, such that neither party is preferred over the other.

Briefly described, the improved speakerphone of the present invention includes control circuitry for controlling the application of audio signals from a duplex communication path, such as a radio channel or telephone line, to utilization circuitry, such as a speaker, and the application of audio signals from an audio signal source, such as a microphone, to the communication path. The speakerphone control circuitry includes, among other things, first and second detectors coupled to the audio signals from the communication path and the microphone, respectively, for generating binary signals indicating the presence of audio signals, a first state indicating audio signals are present and a second state indicating audio signals are absent. A first signal generator generates a binary output signal having a first state when the second detector output signal has a first state, and a second state when both the second detector output signal has a second state and the first detector output signal changes from the second state to the first state. A second signal generator generates a binary output signal having a first state when the first detector output signal has a first state, and a second state when both the first detector output signal has a second state and the second detector output signal changes from the second state to the first state. First and second delay circuitry is coupled to the first and second detector output signals, respectively, for generating binary output signals having the same state as the detector output signals with the exception that changes from the first state to the second state are delayed for a predetermined time interval after the audio signals are absent. The output signals from the first and second detectors, first and second signal generators, and first and second delay circuitry are coupled to control logic circuitry which generates a control signal that causes first and second switching circuitry to apply either audio signals from the communication path to the speaker or audio signals from the microphone to the communication path, respectively. The control signal has a first state for applying audio signals from the communication path to the speaker in response to the second state of the second delay circuitry output signal, the second state of the first signal generator output signal, and the first state of the first detector output signal, conditions occurring when audio signals from the microphone have been absent for a predetermined time interval and audio signals from the communication path are thereafter present. The second state of the control signal applies audio signals from the microphone to the communication path in response to the second state of the first delay circuitry output signal, the second state of the second signal generator output signal, and the first state of the second detector output signal, conditions occurring when audio signals from the communication path have been absent for a predetermined time interval and audio signals from the microphone are thereafter present. Thus, automatic switching is provided between the audio signals from the communication path and the audio signals from the microphone when audio signals from one have been detected after audio signals from the other have been absent for a predetermined time interval.

DETAILED DESCRIPTION OF THE PREFERRED EMBODIMENT

Figure 1:
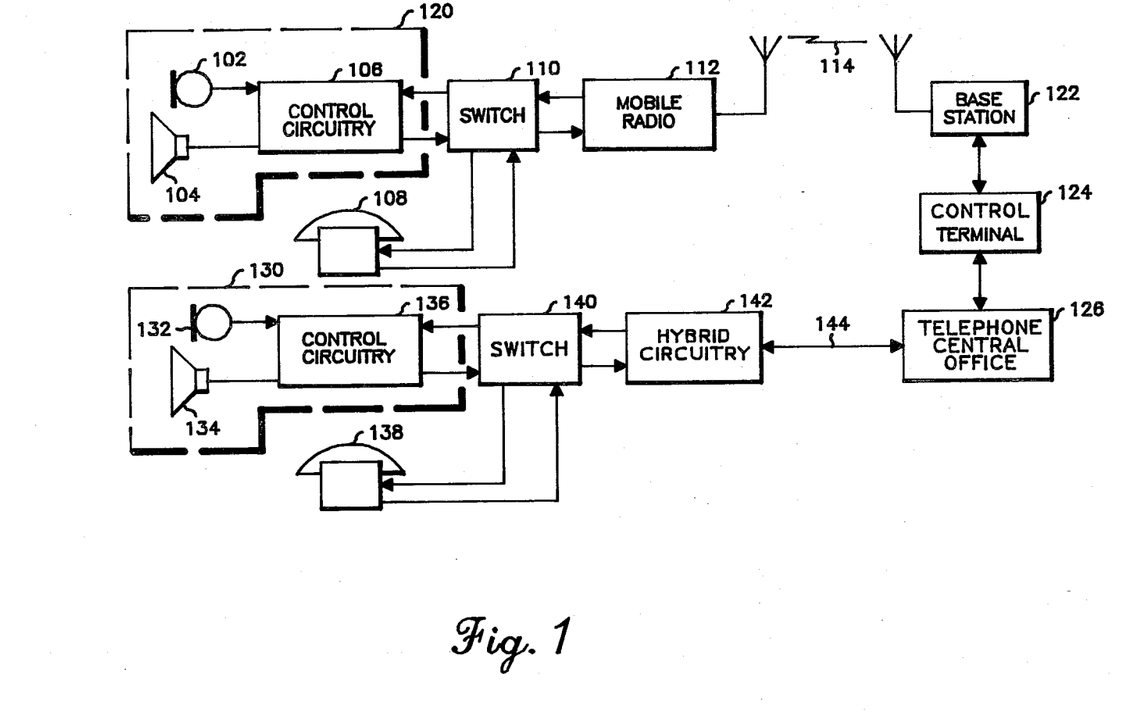
FIG. 1 is a block diagram of a communication system including radio and landline telephones that may advantageously utilize the improved speakerphone embodying the present invention.

In FIG. 1, there is illustrated a communications system including radio telephones 108 and landline telephones 138 that may advantageously utilize the improved speakerphone 120 and 130 embodying the present invention. In conventional radiotelephone systems, such as IMTS (Improved Mobile Telephone Service) systems, a party in a vehicle communicates by way of mobile telephone 108 and mobile radio 112 with a base station 122 which is interconnected by a control terminal 124 to a landline telephone central office 126. The control terminal 124 includes control circuitry that provides a communication path from the base station 122 to hybrid circuitry (not shown) which is inerconnected to a telephone line or trunk of telephone central office 126. A number dialed by the mobile party by means of mobile telephone 108, is received by the control terminal 124 and forwarded to the telephone central office 126 on the telephone line or trunk. The telephone central office 126 receives the dialed telephone number and routes the mobile party to the desired land party telephone, e.g., to landline telephone 138. A similar process is employed when a land party dials the number of a mobile party by means of conventional telephone 138. Furthermore, such communications systems may also include portable radios of the type described in U.S. Pat. Nos. 3,906,166 and 3,962,553 and in an article by Albert J. Leitich and Donald C. Linder, entitled "Portable Radiotelephone for Cellular Systems", published in the Proceedings of the 30th Annual Conference of the IEEE Vehicular Technology Society, Sept. 15-17, 1980, Dearborn, Michigan. Such portable radios can be carried by the user and operated wherever he may be, for example, from his office or his vehicle, and can likewise include the improved speakerphone of the present invention. Further details of the signalling process and the nature of the circuitry for control terminal 124 is provided in Motorola Service Manual 68P81028E65; for the base station 122 in Motorola Service Manual 68P81033E10; and for mobile radio 112 and mobile telephone 108 in Motorola Service Manuals 68P81039E25, 68P81029E65 and 68P81037E85, all of which are published by and available from Motorola Service Publications, Schaumburg, Illinois.

In order to provide a mobile party with the same type of telephone service that a land party receives, it is necessary that each radio channel 114 be a duplex radio channel, having a separate transmit frequency and a separate receive frequency. Thus, mobile radio 112 may be simultaneously transmitting on one frequency and receiving on the other, such that both the mobile and land parties may simultaneously talk and listen. Mobile telephone 108 may include a handset that is similar to handsets typically found in conventional land-line telephone instruments. During a telephone conversation, it is necessary that the mobile party hold the handset up to his ear just as a land party does. However, it would be much safer and convenient for the mobile party if the conversation during a telephone call could be achieved without the necessity of any physical actions. By utilizing the improved speakerphone 120 of the present invention, a mobile party can converse with a land party for the duration of a call with no required physical action, thus freeing the mobile party of tasks which would interfere with the safe operation of his vehicle. The improved speakerphone 120 of the present invention, together with a mobile telephone 108 such as that described in U.S. Pat. Nos. 4,122,304 and 4,220,820 which provides for on-hook automatic dialing of telephone numbers stored in a memory, allows a mobile party to safely make telephone calls without the necessity of removing one of his hands from the steering wheel for the duration of the call. In FIG. 1, speakerphone 120, including microphone 102, speaker 104 and control circuitry 106, is switchably coupled to mobile radio 112 by switch 110. Switch 110 selectively couples a transmit signal and a receive signal from mobile radio 112 to either speakerphone 120 or mobile telephone 108.

In landline applications, the improved speakerphone 130 of the present invention can likewise be used to allow total freedom of movement during conversations and multi-party conference calls. In FIG. 1, speakerphone 130, including microphone 132, speaker 134 and control circuitry 136, can be switchably coupled to hybrid circuitry 142 and thereafter to telephone line 144 by means of switch 140. Switch 140 selectively couples a transmit signal and a receive signal from hybrid circuitry 140 to either speakerphone 130 or a conventional telephone 138. Hybrid circuitry 142 may be any suitable commercially available device for interfacing a transmit signal and receive signal to telephone line 144. Furthermore, there are commercially available telephones 138 that provide for on-hook automatic dialing of telephone numbers stored in memory.

In order to provide for hands-free operation, speakerphones 120 and 130 include a separate microphone 102 and 132, a separate speaker 104 and 134, and control circuitry 106 and 136. Alternatively, the microphone and speaker in the handset of telephones 108 and 138 could be utilized if properly designed and oriented with respect to the hands-free party. In most radio and landline applications, it is advantageous to utilize a separate microphone 102 and 132 for receiving the hands-free party's speech. By experimentation, it has been found that the best mounting location for microphone 102 in a vehicle is on the interior roof lining of the automobile either on the visor or just before the edge of the visor. This location has been found to maximize voice pick-up while minimizing background noise pick-up. In addition this microphone mounting location also provides some degree of inherent vibration damping. Experimentation has also determined that an omni-directional electrode microphone cartridge provides good performance while at the same time being cost effective. Also, for vehicular applications, speaker 104 can be located on the dashboard of the vehicle or on the deck near the rear window of the vehicle. In landline applications, microphone 132 and speaker 134 should also be specially separated to reduce the coupling therebetween.

Figure 2:
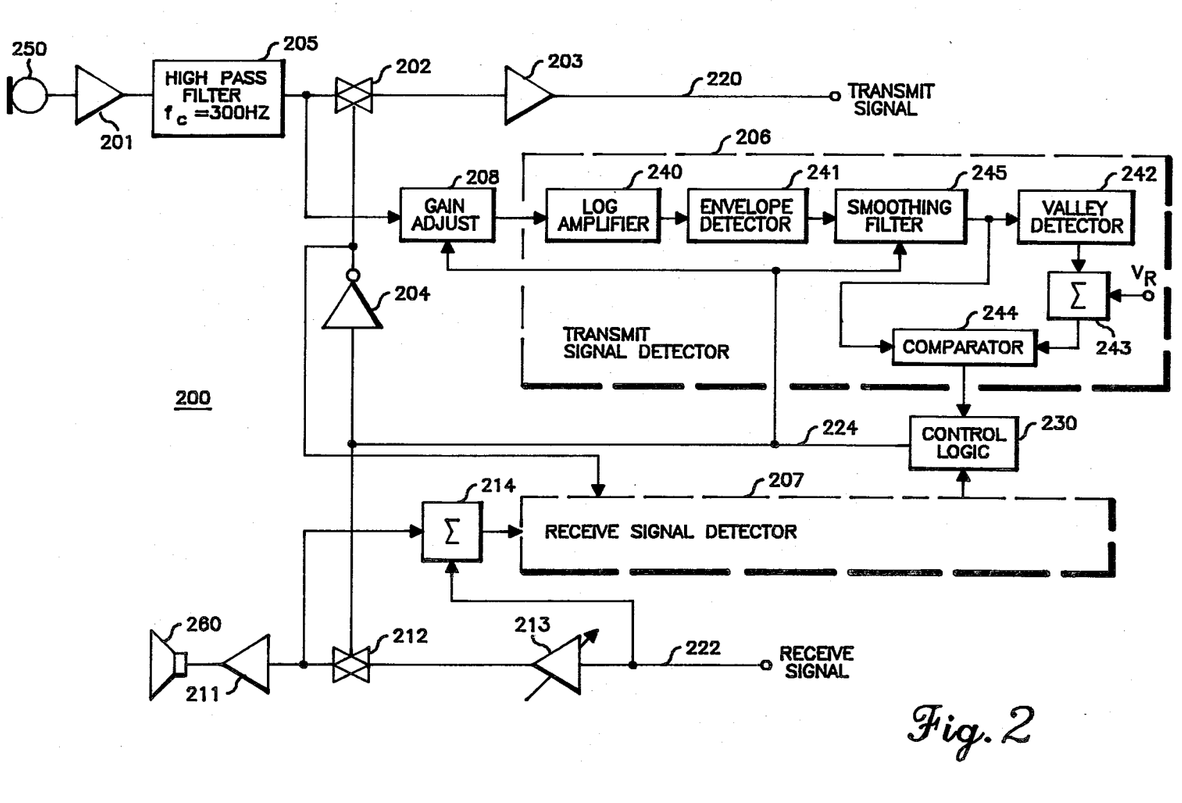
FIG. 2 is a detailed block diagram of the improved speakerphone of the present invention.

Referring to FIG. 2, there is illustrated a detailed block diagram of an improved speakerphone 200 embodying the present invention. The control circuitry of speakerphone 200 interfaces microphone 250 and speaker 260 to a transmit signal 220 and a receive signal 222, respectively, of a duplex communication path. Two audio switches 202 and 212 are included which open to block, or close to pass, audio signals from the microphone 250 or from receive signal 222 in response to a control signal 224 from control logic 230. Thus, only one path is closed by audio switches 202 and 212 at any given time. In the preferred embodiment, audio switches 202 and 212 are transientless, junction FET transistor switches. Also, each of the audio paths includes gain stages, 201 and 203 in the microphone audio path and 211 and 213 in the speaker audio path. Amplifier 213 in the speaker audio path preferably has a variable gain which may be adjusted by the hands-free party for controlling the volume of speaker 112.

The audio signals in the microphone audio path are coupled from amplifier 203 to transmit signal 220 for application to the communication path, which may be a duplex radio channel 114 or a telephone line 144 in FIG. 1. Audio signals received from the communication path are selectively coupled by receive signal 222 to amplifier 213 in the speaker audio path. In radio applications, the transmit signal 220 is coupled to the transmitter, and the receive signal 222 is coupled to the receiver, of a mobile or portable radio, such as radio 112 in FIG. 1. In landline applications, the transmit signal 220 is coupled to the transmit input, and the receive signal 222 is coupled to the receive output, of conventional hybrid circuitry 142 in FIG. 1, which interfaces telephone 138 to its associated telephone line 144.

The hands-free control circuitry 200 in FIG. 2 also includes transmit and receive signal detectors 206 and 207 for detecting the presence of the hands-free party's voice signals and the called party's voice signals, respectively. If microphone 250 does not provide a high-pass response, a high-pass filter 250 may be interposed between microphone 250 and transmit signal detector 206. The microphone signal is high-pass filtered by filter 205 in order to remove low frequency background noise. A high-pass filter having a cut off frequency of approximately 300 Hz will filter out most of this low frequency background noise. Similar high-pass filtering may also be added to the receive signal path 222. Furthermore, in applications that are not characterized by such low frequency background noise, a high-pass filter 205 may not be required in either audio path.

The transmit and receive signal detectors 206 and 207 include substantially identical circuit blocks 240–245. Both detectors 206 and 207 are comprised of conventional circuit blocks including a logarithmic amplifier 240 (commonly referred to as a "soft" limiter); an evelope detector 241, a smoothing filter 245, a valley detector 242, a summer 243 and a comparator 244. The logarithmic amplifier 240 extends the dynamic range of the detectors 241 due to its amplification characteristic. The envelope detector 241 provides an output signal which follows the maxima and minima, or envelope, of the audio signals. The smoothing filter 245 provides variable bandwidth low-pass filtering depending on the binary state of control signal 224. The valley detector 242 operates as a rectifier which follows the minima of the smoothing filter output. The valley detector output essentially corresponds to the steady state background noise present on the transmit signal 220 in the case of detector 206 or on the receive signal 222 in the case of detector 207. Summer 243 adds a reference voltage $V_r$ to the valley detector output. By adding the offset voltage $V_r$ to the valley detector output, comparator 244 will not generate spurious output signals due to low amplitude variations of background noise. Thus, the comparator 244 will only provide an output signal if the envelope detector output exceeds the steady state background noise by the magnitude of the reference voltage $V_r$. The offset voltage $V_r$ is chosen together with the response characteristics of the envelope detector 241 so as to avoid generation of spurious comparator output signals due to low amplitude variations of the background noise. The output signal from comparator 244 has a high voltage level, or binary one state, when the envelope detector output exceeds the valley detector output by the offset voltage $V_r$ and otherwise has a low voltage level, or binary zero state. A binary one state of the output signal from comparator 244 in detector 206 into control logic 230 indicates that audio signals from microphone 250 have been detected, and a binary one state from the comparator in detector 207 into the control logic 230 indicates that audio signals from the receive signal 222 have been detected.

Summer 214 in FIG. 2 applies to receive signal detector 207 a signal that is the sum of both the audio signals from the receive signal 222 and the audio signals from audio switch 212. Amplifier 213 has a variable gain control to allow the hands-free party to adjust the volume of speaker 260. Thus, the signal applied by summer 214 to detector 207 varies as the volume of speaker 260 is varied. Allowing the signal level applied to detector 207 to increase as the volume of speaker 260 increases, and vice versa, helps to maintain a balance between the signal levels applied to the receive signal detector 207 and transmit signal detector 206. As a result, the rise and fall times of detectors 206 and 207 are substantially equalized over the volume range of the speaker 260. This feature of the speakerphone control circuitry avoids unnecessary switching between the transmit audio path and receive audio path. In addition, the feature insures that an increase in the volume of speaker 260 does not make it more difficult for the hands-free party to keep the transmit audio path closed.

The control logic 230 in FIG. 2 is responsive to the output signals from the transmit and receive signal detectors 206 and 207. The control circuitry 230 provides a control signal 224 for opening and closing audio switch 212 and audio switch 202 via inverting gate 204. When audio switch 212 is opened, audio switch 202 is closed, and vice vesa.

Figure 3:
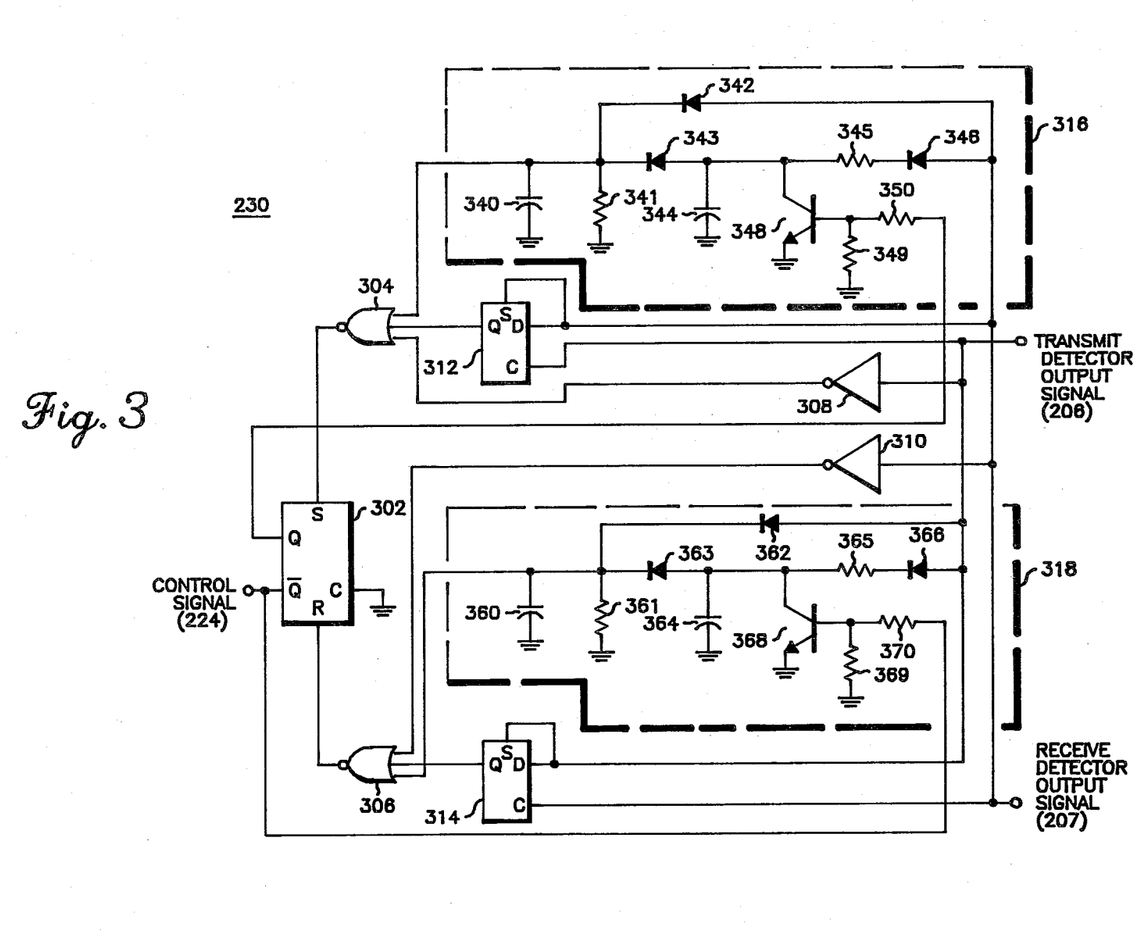
FIG. 3 is a detailed circuit diagram of the control logic block 230 in FIG. 2.

The control circuitry 230 in FIG. 2 is illustrated in more detail in the circuit diagram in FIG. 3. In FIG. 3, the control signal 224 for audio switches 202 and 212 in FIG. 2 is provided by flip-flop 302. When the Q output of flip-flop 302 has a binary one state, audio switch 212 is closed and audio switch 202 is open; and when the $\overline{Q}$ output of flip-flop 202 has a binary zero state, audio switching 202 is closed and audio switch 212 is open. When the audio switch 202 or 212 is closed, it passes audio signals and when audio switch 202 or 212 is open, it blocks audio signals. Audio switch 202 is closed to pass audio signals from the microphone 250 to transmit signal 220. Audio switch 202 closes when the output signal from the receive signal detector 207 has been absent for a time interval defined by delay circuitry 316, and thereafter the output signal from the transmit signal detector 206 indicates that the hands-free party is starting to speak. Similarly, audio switch 212 is closed to pass audio signals from the receive signal 222 to speaker 260. Audio switch 212 closes when the output signal from the transmit signal detector 206 has been absent for a time interval defined by delay circuitry 318 and thereafter the output signal from the receive signal detector 207 indicates that the receive party is starting to speak.

Referring to FIG. 3, the $\overline{Q}$ output of the flip-flop 302 will be set to a binary zero state (low voltage level) enabling audio switch 202 when NOR gate 304 has a binary one state (high voltage level). NOR gate 304 provides a binary one state at its output when the output signal from detector 206 changes to a binary one state indicating that the hands-free party's speech has been detected, the output signal from receive signal detector 207 has had a binary zero state for a time interval defined by delay circuitry 316, and the output of flip-flop 312 has a binary zero state. The Q output of flip-flop 302 will be set to a binary one state enabling audio switch 212 when NOR gate 306 has a binary one state. NOR gate 306 provides a binary one state at its output when the output signal from detector 207 changes to a binary one state, the output signal from detector 206 has had a binary zero state for a time interval defined by delay circuitry 318, and the Q output of flip-flop 314 has a binary zero state.

Delay circuitry 316 and 318 in FIG. 3 both have fast charge paths provided by diodes 342 and 362, respectively. Thus, when the output signal from detector 206 changes to a binary one state, diode 362 bypasses components 363, 365 and 366 so that capacitor 360 quickly charges to a high voltage level. Likewise, when the output signal from detector 207 changes to a binary one state, diode 342 bypasses components 343, 345 and 346 so that capacitor 340 quickly charges to a high voltage level. Both delay circuitry 316 and 318 provide delay time intervals when discharging from a high voltage level to a low voltage level in response to changes of the output signals from detectors 206 and 207, respectively, from a binary one state to a binary zero state. Thus, according to the present invention, audio path switching from one party to another, commonly referred to as break-in, may take place immediately upon detection of the speech of the party breaking-in if the other party's delay circuitry 316 or 318 has discharged to a low voltage level, i.e. a binary zero state. However, if the party whose audio path is presently closed continues to speak, his delay circuitry 316 or 318 will remain charged to a high voltage level, i.e. a binary one state, preventing break-in by the other party.

The time intervals for the delay circuitry 316 and 318 is a compromise which reflects conflicting requirements for fast break-in, minimal spurious path switching, and minimum degradation of operational characteristics in the presence of high background noise. The time intervals for delay circuitry 316 and 318 include a fixed time interval and a variable time interval having a magnitude dependent on the duration of the output signal from detectors 207 and 206, respectively. In the preferred embodiments, delay circuitry 316 and 318 provide a short time interval of approximately 10 milliseconds for output signals from detectors 207 and 206 having a short duration; and provide a variable time interval ranging from zero to approximately 130 milliseconds for output signals from detectors 207 and 206 having a long duration. The time interval provided by delay circuitry 316 and 318 will, therefore, vary between a minimum of 10 milliseconds and maximum of 140 milliseconds. Furthermore, by proper design of delay circuitry 316 and 318, the time interval can be chosen to be proportional to the duration of the output signal from detectors 207 and 206 over the range from 10 milliseconds to 140 milliseconds.

In general, the time interval of delay circuitry 316 and 318 may vary from 5 to 400 milliseconds depending upon the requirements of a particular application of the speakerphone of the present invention. A predetermined minimum amount of time delay, such as 5 to 10 milliseconds, is always necessary to avoid spurious audio path switching caused by signal delay through the communications network, i.e. the control terminal 124 and telephone central office 126, at the cessation of either party's speech.

In the preferred embodiment of a landline speakerphone, capacitor 340 and resistor 341 in delay circuitry 316, and capacitor 360 and resistor 361 in delay circuitry 318, have a time constant of approximately 10 milliseconds, while capacitor 344 and resistor 341 in delay circuitry 316, and capacitor 364 and resistor 361 in delay circuitry 318, have a time constant of approximately 130 milliseconds. This selection of time constants provides a fixed time delay of approximately 10 milliseconds and a variable time delay of from 0–130 milliseconds in the preferred embodiment of delay circuitry 316 and 318. The proportionality between the variable time delay of capacitor 344 and resistor 341 of delay circuitry 316 and the duration of the receive detector output signal 207 is controlled by the time constant of capacitor 344 and resistor 345 which can range from 30 to 150 milliseconds depending on the environment of the application and is 68 milliseconds in the preferred embodiment of a landline speakerphone. Likewise capacitor 364 and resistor 365 of delay circuitry 318 control the proportionality of the variable time delay with respect to the duration of the transmit detector output signal 206.

The foregoing features of the present invention facilitate closing of one audio path when short bursts of audio signals are occurring on the presently closed audio path. If these bursts are relatively short, one party can break-in on the other during pauses between the bursts, since the time interval of the delay circuitry 316 or 318 is also rather short under such conditions.

According to another feature of the present invention, break-in is allowed only when the breaking in party speaks after the party on the presently closed audio path has not provided sufficient audio activity to maintain a detector output signal (206 or 207). Flip-flops 312 and 314 are used to provide this feature of the present invention. Assuming all other inputs to NOR gate 304 or 306 have binary zero state, break-in takes place if the Q output of flip-flop 312 or 314, respectively, momentarily has a binary zero state. For example, the Q output of flip-flop 312 will have a binary zero state when the receive detector output signal (207) has a binary zero state (no audio signals being detected on the receive signal 222) and the transmit detector output signal (206) thereafter changes state from a binary zero state to a binary one state (indicating that the hands-free party is starting to speak). Flip-flop 314 operates in a similar manner. This operation of flip-flops 312 and 314 allows a party to break-in only if he generates a detector output signal after the other party loses his detector output signal. The major reason for this feature is to prevent spurious post syllabic switching caused by near simultaneous detector outputs which are due to sidetone in control terminal 124 or telephone center office 126 in FIG. 1 and sidetone due to speaker to microphone coupling in the speakerphone.

Figure 4:
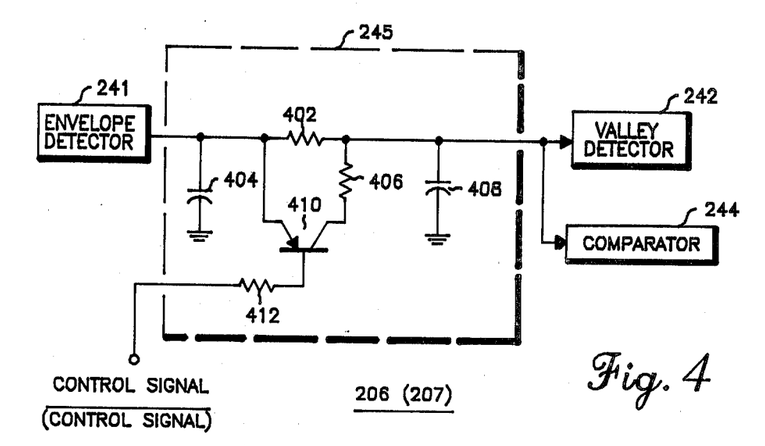
FIG. 4 is a detailed circuit diagram for the smoothing filter block 245 in FIG. 2.

According to yet another feature of the present invention, smoothing filter 245 in FIG. 2 is included in detectors 206 and 207 for increasing the smoothing in the microphone audio path when the speaker audio path is closed, and vice versa. This feature of the present invention minimizes syllabic attack time chopping due to sidetone in control terminal 124 or telephone central office 126 in FIG. 1 and sidetone due to speaker to microphone coupling in the speakerphone. Referring to FIG. 4 smoothing filter 245 includes capacitors 404 and 408, resistors 402, 406 and 412 and transistor 410. Transistor 410 is turned on in response to a binary zero state of the control signal 224 in FIG. 2 in the case of detector 206 and a binary one state of the control signal 224 in the case of detector 207. When transistor 410 turns on resistor 406 is coupled in parallel with resistor 402, lowering effective magnitude of the resistance in the path between envelope detector 240 and both valley detector 242 and comparator 244. As a result, the signal gain is increased and the response time is lowered when transistor 410 turns on. The effect of this feature of the present invention is that the detect gain and response time of detector 206 or 207 for the signal path that is closed are higher than that for the detector attempting to break in even though the breaking-in signal level may be higher. Thus, if the speaker audio path is enabled, receive signal detector 207 has the higher gain and faster response time; and if the microphone audio path is enabled, transmit signal detector 206 has the higher gain and faster response time.

Figure 5:
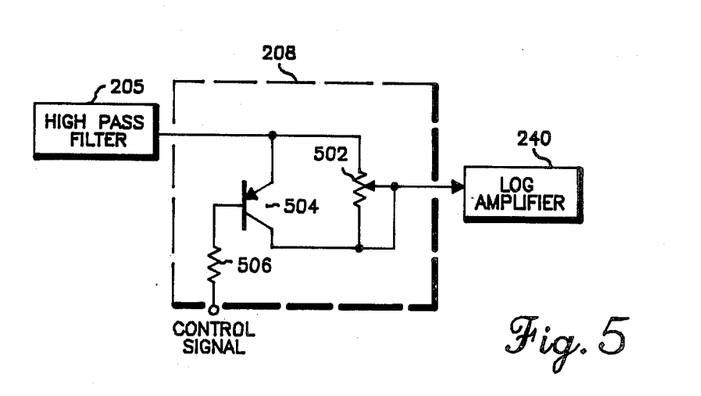
FIG. 5 is a detailed circuit diagram for the gain adjust block 208 in FIG. 2.

According to a further feature of the present invention, gain adjust circuitry 208 in FIG. 2 is interposed between high pass filter 205 and the logarithmic amplifier 240 of the transmit signal detector 206 in order to further minimize syllabic attack time chopping. Referring to FIG. 5, the gain adjust circuitry 208 includes a potentiometer 502, transistor 504 and resistor 506. Transistor 504 is turned on in response to a binary zero state of the control signal 224 in FIG. 2, and shorts out potentiometer 504. As a result, the signal gain of the transmit signal detector 206 is increased when the transmit signal path is closed. The gain of the transmit signal detector is reinforced over and above the increase provided by smoothing filter 245 in FIG. 2 because sidetone introduced in the hybrid circuitry at control terminal 124 in FIG. 1 typically enhances the receive signal level to a greater degree than sidetone due to speaker to microphone coupling in the speakerphone.

The logic circuit elements 302, 304, 306, 308, 310, 312 and 314 in FIG. 3 may be mechanized by utilizing the circuit elements in conventional integrated circuits, such as the CMOS integrated circuits described in the "CMOS Integrated Circuit Book", published by Motorola Semiconductor Products, Inc., Austin, Texas, 1978.

The improved speakerphone of the present invention may be advantageously utilized in a wide variety of applications requiring complete freedom of movement or multiple-party conference calls. For example, the improved speakerphone of the present invention can be utilized to provide hands-free communications to a mobile party in radio telephone systems or to a land party in landline telephone systems. The speakerphone of the present invention can be adapted for wide variety of applications since the level of ambient background noise is taken into consideration. Furthermore, the inventive speakerphone provides for fast break-in by either party, while minimizing spurious audio path switching.

I claim:

1. Circuitry for controlling the application of audio signals from a communication path to utilization means and the application of audio signals from an audio signal source to the communication path, comprising:

first and second detecting means for detecting the presence of audio signals from the communication path and the audio signal source, respectively, and each generating an output signal having a first state when audio signals are present and a second state when audio signals are absent;

first generating means for generating an output signal having a first state when the second detecting means output signal has a first state, and a second state when both the second detecting means output signal has a second state and the first detecting means output signal changes from the second state to the first state;

second generating means for generating an output signal having a first state when the first detecting means output signal has a first state, and a second state when both the first detecting means output signal has a second state and the second detecting means output signal changes from the second state to the first state;

first and second delay means, coupled to the first and second detecting means, respectively, for each generating an output signal having a first state when the corresponding detecting means output signal has a first state, and having a second state a predetermined time interval after the corresponding detecting means output signal has a second state;

control means for generating a control signal having a first state in response to the second state of the second delay means output signal, the second state of the first generating means output signal and the first state of the first detecting means output signal, and a second state in response to the second state of the first delay means output signal, the second state of the second generating means output signal and the first state of the second detecting means output signal;

first switching means responsive to the first state of the control signal for applying audio signals from the communication path to the utilization means; and second switching means responsive to the second state of the control signal for applying audio signals from the audio signal source to the communication path.

2. The control circuitry according to claim 1, further including filtering means interposed between the audio signal source and the second detecting means for filtering audio signals therebetween.

3. The control circuitry according to claim 2, further including means interposed between the audio signal source and the second detecting means for attenuating the audio signals by first and second predetermined amounts in response to the first and second states of control signal, respectively, the first predetermined amount having a magnitude greater than the second predetermined amount.

4. The control circuitry according to claim 2 further including second filtering means interposed between the communication path and the first detecting means for filtering audio signals therebetween.

5. The control circuitry according to claim 1, wherein said first and second detecting means each further include valley detecting means for dynamically detecting the minima of the audio signals and means for comparing the detected minima to the audio signals and generating the first state of the respective detecting means output signal when the audio signals are greater than the detected minima and the second state of the respective detecting means output signal when the audio signals are less than the detected minima.

6. The control circuitry according to claim 5, wherein said first and second detecting means each further include summing means interposed between the valley detecting means and the comparing means for summing the detected minima and a predetermined reference signal to provide a summed signal, the summed signal being compared to the audio signals by the comparing means.

7. The control circuitry according to claim 6, wherein said first and second detecting means each further include envelope detecting means for generating an output signal having a magnitude proportional to the envelope of the audio signals and applying the output signal therefrom to the valley detecting means and comparing means.

8. The control circuitry according to claim 7, wherein said first and second detecting means each further include logarithmic amplifying means for logarithmically amplifying the audio signals and applying the logarithmically amplified audio signals to the envelope detecting means.

9. The control circuitry according to claim 1, wherein said control means includes means for storing the control signal.

10. The control circuitry according to claim 1, further including amplifying means interposed between the communication path and the first switching means for amplifying the audio signals therebetween by a predetermined amplification factor, and means for summing the audio signals from the amplifying means and second switching means for application to the first detecting means.

11. The control circuitry according to claim 10, further including means for varying the amplification factor provided by the amplifying means.

12. The control circuitry according to claim 1, wherein said first and second detecting means each further include logarithmic amplifying means for logarithmically amplifying the audio signals, envelope detecting means for generating an output signal having a magnitude proportional to the envelope of the signals from the logarithmic amplifying means, valley detecting means for dynamically detecting the minima of the signals from the envelope detecting means, means for summing the detected minima from the valley detecting means and a predetermined reference voltage, and means for comparing the signals from the summing means and the signals from the envelope detecting means and generating the first state of the respective detecting means output signal when the envelope detecting means signals are greater than the summing means signals and generating the second state of the respective detecting means output signal when the envelope detecting means signals are less than the summing means signals.

13. The control circuitry according to claim 7 or 12, wherein said first detecting means further includes filtering means interposed between the envelope detecting means and both the valley detecting means and comparator means for further filtering the output signal from the envelope detecting means, the filtering means including means for selecting first and second frequency passbands in response to the first and second states of the control signal, the first passband passing a wider band of signal frequencies than the second passband; and wherein said second detecting means further includes filtering means coupled to the output of the envelope detecting means for further filtering the audio signals therefrom, the filtering means including means for selecting first and second frequency passbands in response to the second and first states of the control signal, the first passband passing a wider band of signal frequencies then the second passband.

14. The control circuitry according to claim 1, further including amplifying means interposed between the audio signal source and the second detecting means for amplifying the audio signals therebetween by a predetermined amplification factor.

15. The control circuitry according to claim 14, further including means for varying the amplification factor provided by the amplifying means.

16. The control circuit according to claim 1, 2, 4, 5, 8, 9, 10, 12 or 14, wherein said first delay means includes means for generating a predetermined time interval when the first detecting means output signal changes from the first state to the second state, means for generating a variable time interval when the first detecting means output signal changes from the first state to the second state, and means for terminating the variable time interval in response to the second state of the control signal, said variable time interval having a magnitude substantially proportional to the presence of audio signals from the communication path, and said first delay means generating the second state of its output signal after a time interval that is the sum of the predetermined time interval and the variable time interval; and wherein said second delay means includes means for generating a predetermined time interval when the second detecting means output signal changes from the first state to the second state, means for generating a variable time interval when the second detecting means output signal changes from the first state to the second state, and means for terminating the variable time interval in response to the first state of the control signal, said variable time interval having a magnitude substantially proportional to the presence of audio signals from the audio signal source, and said second delay means generating the second state of its output signal after a time interval that is the sum of the predetermined time interval and the variable time interval.

17. The control circuitry according to claim 16, adapted for use with a radio frequency signal communication path, transmitting means for transmitting a radio frequency signal and modulating audio signals thereon, and receiving means for receiving a radio frequency signal and demodulating audio signals modulated thereon; and wherein said utilization means comprises speaker means, and said audio signal source comprises microphone means, said control means controlling the application of audio signals from the receiving means to the speaker means and the application of audio signals from the microphone means to the transmitting means.

18. The control circuitry according to claim 16, adapted for use with a wire line communication path, transmitting means for transmitting audio signals on the wire line communication path, and receiving means for receiving audio signals from the wire line communication path; and wherein said utilization means comprises speaker means, and said audio signal source comprises microphone means, said control means controlling the application of audio signals from the receiving means to the speaker means and the application of audio signals from the microphone means to the transmitting means.

19. Circuitry for controlling the application of audio signals from a communication path to speaker means and the application of audio signals from an microphone means to the communication path, comprising:

first and second detecting means for detecting the presence of audio signals from the communication path and the audio signal source, respectively, and each generating an output signal having a first state when audio signals are present and a second state when audio signals are absent;

first generating means for generating an output signal having a first state when the second detecting means output signal has a first state, and a second state when both the second detecting means output signal has a second state and the first detecting means output signal changes from the second state to the first state;

second generating means for generating an output signal having a first state when the first detecting means output signal has a first state, and a second state when both the first detecting means output signal has a second state and the second detecting means output signal changes from the second state of the first state;

first and second delay means, coupled to the first and second detecting means, respectively, for each generating an output signal having a first state when the corresponding detecting means output signal has a first state, and having a second state a predetermined time interval after the corresponding detecting means output signal has a second state;

control means for generating a control signal having a first state in response to the second state of the second delay means output signal, the second state of the first generating means output signal and the first state of the first detecting means output signal, and a second state in response to the second state of the first delay means output signal, the second state of the second generating means output signal and the first state of the second detecting means output signal;

first switching means responsive to the first state of the control signal for applying audio signals from the communication path to the speaker means; and second switching means responsive to the second state of the control signal for applying audio signals from the microphone means to the communication path.

20. The control circuit according to claim 19, wherein said first delay means includes means for generating a predetermined time interval when the first detecting means output signal changes from the first state to the second state, means for generating a variable time interval when the first detecting means output signal changes from the first state to the second state, and means for terminating the variable time interval in response to the second state of the control signal, said variable time interval having a magnitude substantially proportional to the presence of audio signals from the communication path, and said first delay means generating the second state of its output signal after a time interval that is the sum of the predetermined time interval and the variable time interval; and wherein said second delay means includes means for generating a predetermined time interval when the second detecting means output signal changes from the first state to the second state, means for generating a variable time interval when the second detecting means output signal changes from the first state to the second state, and means for terminating the variable time interval in response to the first state of the control signal, said variable time interval having a magnitude substantially proportional to the presence of audio signals from the audio signal source, and said second delay means generating the second state of its output signal after a time interval that is the sum of the predetermined time interval and the variable time interval.

21. The control circuitry according to claim 20, further including filtering means interposed between the audio signal source and the second detecting means for filtering audio signals therebetween.

22. The control circuitry according to claim 21, further including means interposed between the audio signal source and the second detecting means for attenuating the audio signals by first and second predetermined amounts in response to the first and second states of control signal, respectively, the first predetermined amount having a magnitude greater than the second predetermined amount.

23. The control circuitry according to claim 20, wherein said first and second detecting means each further include logarithmic amplifying means for logarithmically amplifying the audio signals, envelope detecting means for generating an output signal having a magnitude proportional to the envelope of the signals from the logarithmic amplifying means, valley detecting means for dynamically detecting the minima of the signals from the envelope detecting means, means for summing the detected minima from the valley detecting means and a predetermined reference voltage, and means for comparing the signals from the summing means and the signals from the envelope detecting means and generating the first state of the respective detecting means output signal when the envelope detecting means signals are greater than the summing means signals and generating the second state of the respective detecting means output signal when the envelope detecting means signals are less than the summing means signals.

24. The control circuitry according to claim 23, wherein said first detecting means further includes filtering means interposed between the envelope detecting means and both the valley detecting means and comparator means for filtering the output signal from the envelope detecting means, the filtering means including means for selecting first and second frequency passbands in response to the first and second states of the control signal, the first passband passing a wider band of signal frequencies then the second passband; and wherein said second detecting means further includes filtering means coupled to the output of the envelope detecting means for filtering the audio signals therefrom, the filtering means including means for selecting first and second frequency passbands in response to the second and first states of the control signal, the first passband passing a wider band of signal frequencies then the second passband.

25. The control circuitry according to claim 19, 20, 22, or 24 adapted for use with a radio frequency signal communication path, transmitting means for transmitting a radio frequency signal and modulating audio signals thereon, and receiving means for receiving a radio frequency signal and demodulating audio signals modulated thereon; said control means controlling the application of audio signals from the receiving means to the speaker means and the application of audio signals from the microphone means to the transmitting means.

26. The control circuitry according to claim 19, 20, 22, or 24 adapted for use with a wire line communication path, transmitting means for transmitting audio signals on the wire line communication path, and receiving means for receiving audio signals from the wire line communication path; said control means controlling the application of audio signals from the receiving means to the speaker means and the application of audio signals from the microphone means to the transmitting means.

27. A method for controlling the application of audio signals from a communication path to utilization means and the application of audio signals from an audio signal source to the communication path, said method comprising the steps of:

detecting the presence of audio signals from the communication path and generating a first output signal having a first state when audio signals are present and a second state when audio signals are absent;

detecting the presence of the audio signals from the audio signal source and generating a second output signal having a first state when audio signals are present and a second state when audio signals are absent;

generating a third output signal having a first state when the second output signal has a first state, and a second state when both the second output signal has a second state and the first output signal changes from the second state to the first state;

generating a fourth output signal having a first state when the first output signal has a first state, and a second state when both the first output signal has a second state and the second output signal changes from the second state to the first state;

generating a fifth output signal having a first state when the first output signal has a first state, and a second state a predetermined time interval after the first output signal has a second state;

generating a sixth output signal having a first state when the second output signal has a first state, and a second state a predetermined time interval after the second output signal has a second state;

control means for generating a control signal having a first state in response to the second state of the sixth output signal, the second state of the third output signal and the first state of the first of the first output signal, and a second state in response to the second state of the fifth output signal, the second state of the fourth output signal and the first state of the second output signal;

applying audio signals from the communication path to the utilization means in response to the first state of the control signal; and applying audio signals from the audio signal source to the communication path in response to the second state of the control signal.

* * * * *

UNITED STATES PATENT AND TRADEMARK OFFICE
CERTIFICATE OF CORRECTION

PATENT NO. : 4,400,584
DATED : August 23, 1983
INVENTOR(S) : RICHARD J. VILMUR

It is certified that error appears in the above—identified patent and that said Letters Patent is hereby corrected as shown below:

In column 13, line 29 (claim 19), delete "of" and insert --to--.

Signed and Sealed this

Thirty-first Day of July 1984

[SEAL]

Attest:

Attesting Officer

GERALD J. MOSSINGHOFF
Commissioner of Patents and Trademarks